(12) United States Patent
Iizawa

(10) Patent No.: US 11,688,422 B2
(45) Date of Patent: Jun. 27, 2023

(54) STORAGE CONTROL APPARATUS AND STORAGE CONTROL METHOD

(71) Applicant: FUJITSU LIMITED, Kawasaki (JP)

(72) Inventor: Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/730,787

(22) Filed: Apr. 27, 2022

(65) Prior Publication Data

US 2023/0010385 A1 Jan. 12, 2023

(30) Foreign Application Priority Data

Jul. 7, 2021 (JP) ................................. 2021-112818

(51) Int. Cl.
  *G11B 5/55* (2006.01)
  *G11B 5/584* (2006.01)
  *G11B 5/008* (2006.01)

(52) U.S. Cl.
  CPC ........ *G11B 5/5508* (2013.01); *G11B 5/00821* (2013.01); *G11B 5/584* (2013.01)

(58) Field of Classification Search
  None
  See application file for complete search history.

(56) References Cited

U.S. PATENT DOCUMENTS

| | | | | |
|---|---|---|---|---|
| 4,896,224 A * | 1/1990 | Tobe | .................. | G11B 15/4677 386/318 |
| 5,363,253 A * | 11/1994 | Nash | ..................... | G11B 15/125 360/73.06 |
| 5,541,737 A * | 7/1996 | Oguro | ................. | G11B 15/1875 386/253 |
| 5,933,567 A * | 8/1999 | Lane | ................... | H04N 21/4147 |
| 5,940,232 A * | 8/1999 | Okuyama | ............. | H04N 5/765 |
| 6,219,726 B1 * | 4/2001 | Ripberger | ............... | G06F 21/80 710/36 |
| 6,560,402 B1 * | 5/2003 | Misawa | ............... | H04N 5/9261 |
| 2001/0017743 A1 * | 8/2001 | Hamai | ............... | G11B 27/3027 |
| 2006/0045469 A1 * | 3/2006 | Matsui | ................. | G11B 27/032 |
| 2009/0287982 A1 * | 11/2009 | Kabelac | ............... | G11B 27/107 714/E11.023 |

(Continued)

FOREIGN PATENT DOCUMENTS

| | | |
|---|---|---|
| JP | 2009-169475 A | 7/2009 |
| JP | 2013-206518 A | 10/2013 |
| JP | 2016-115377 A | 6/2016 |

*Primary Examiner* — Peter Vincent Agustin
(74) *Attorney, Agent, or Firm* — ArentFox Schiff LLP

(57) ABSTRACT

A storage control apparatus controls a tape apparatus including a plurality of tape drives. The storage control apparatus is configured to calculate, when causing the tape apparatus to execute write processing of dividing write data into a predetermined size and writing to a plurality of magnetic tapes, a write start position of the write data for each of the plurality of magnetic tapes where the write start position being different in each of the plurality of magnetic tapes and instruct the tape apparatus with the write start positions, and specify, when a reading range is designated, a read start position indicating a head of data in the reading range for each magnetic tape, and instruct the tape apparatus to read data in the reading range in an order from a magnetic tape of which the read start position is closer to an end of the magnetic tape.

5 Claims, 17 Drawing Sheets

(56) References Cited

U.S. PATENT DOCUMENTS

2015/0318006 A1* 11/2015 Cherubini .............. G11B 5/584
                                                                             360/71
2016/0170681 A1     6/2016   Hasegawa et al.

* cited by examiner

| TAPE CARTRIDGE C1 | | |
|---|---|---|
| WRAP NUMBER | LPOS | REPRODUCTION TIME |
| #1 | 0 | t0 |
| #1 | s/10 | t1 |
| #1 | 2s/10 | t2 |
| #1 | 3s/10 | t3 |
| #1 | 4s/10 | t4 |
| #1 | 5s/10 | t5 |
| #1 | 6s/10 | t6 |

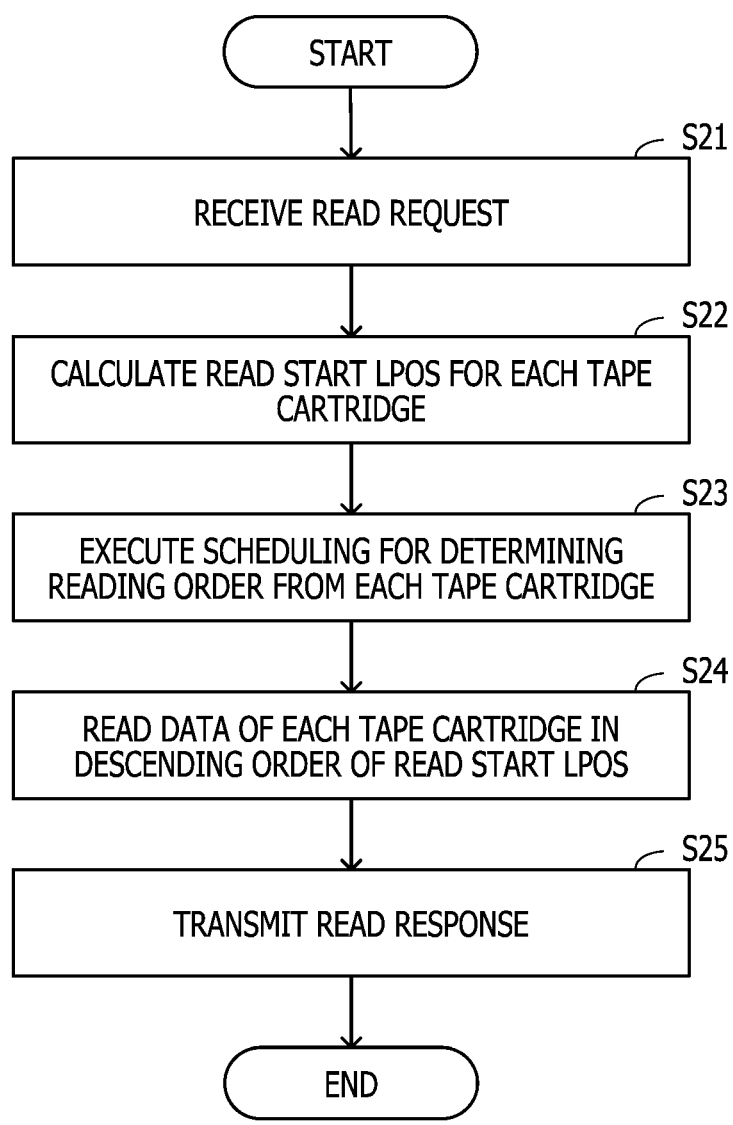

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2021-112818, filed on Jul. 7, 2021, the entire contents of which are incorporated herein by reference.

FIELD

The embodiments disclosed herein relate to a storage control apparatus and a storage control method.

BACKGROUND

A tape storage system is a system that stores and manages data by using a magnetic tape. A tape drive is used to access the magnetic tape, and in the tape drive, a magnetic tape housed in a tape cartridge is pulled out, and data is read and written by a magnetic head. Unloading (taking out) of the tape cartridge from the tape drive and loading (storing) of the tape cartridge into the tape drive are performed by a transport robot.

In a case where a tape storage system includes a plurality of tape drives, speed of write and read processing of data may be increased by striping. In the striping, write data is divided into a predetermined size and distributed to a plurality of magnetic tapes, so that the write data is written to the plurality of magnetic tapes in a distributed manner.

As a related technique, for example, a technique of dividing a file into predetermined segments based on a predicted number of available tape drives so that a time taken to read the file is shortened, and writing the file of the divided segments to corresponding tapes has been proposed. A technique of determining a recording position for recording a copy file so that an average access distance from a magnetic head portion is the shortest, and recording the copy file at the determined recording position has been proposed. A technique of making actual storage positions of data in divided regions over a disk are different for each disk, and arranging storage positions of data in a redundant relationship on each disk so that the positions are different for each disk has been proposed.

Japanese Laid-open Patent Publication Nos. 2016-115377, 2013-206518, and 2009-169475 are disclosed as related art.

SUMMARY

According to an aspect of the embodiments, a storage control apparatus that performs control of a tape apparatus including a plurality of tape drives, the storage control apparatus comprising a memory, and a processor coupled to the memory and configured to calculate, when causing the tape apparatus to execute write processing of dividing write data into a predetermined size and writing to a plurality of magnetic tapes by using the plurality of tape drives by striping, based on a number of magnetic tapes included in the plurality of magnetic tapes, a track size for one track in the plurality of magnetic tapes, and an order of mounting the plurality of magnetic tapes on any of the plurality of tape drives, a write start position of the write data for each of the plurality of magnetic tapes where the write start position being different in each of the plurality of magnetic tapes and instruct the tape apparatus with the write start positions; and specify, when a reading range is designated from the write data, a read start position indicating a head position of data in the reading range for each of the plurality of magnetic tapes, and instruct the tape apparatus to read data in the reading range in an order from a magnetic tape of which the read start position is closer to an end of the magnetic tape among the plurality of magnetic tapes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a data management table;

FIG. 17 is a flowchart illustrating an example of data read processing.

DESCRIPTION OF EMBODIMENTS

In the technique of writing write data to a plurality of magnetic tapes in a distributed manner by striping as described above, write data is normally written from the same write start position on each magnetic tape. In this case, when a reading range is designated from the write data, a head position of the data in the reading range is the same in each magnetic tape.

However, in a case where the magnetic tapes are loaded to the plurality of tape drives by one transport robot, the magnetic tapes are sequentially loaded to each tape drive.

For this reason, the timing at which reading may be started differs for each magnetic tape, and a period during which data may be read in parallel among the plurality of tape drives is shortened by an amount of shift of the timing. As a result, there is a problem that the effect of shortening a reading time by the striping is not sufficiently exhibited.

According to one aspect, an object of the embodiment is to provide a storage control apparatus and a storage control method in which an average reading time of data is shortened.

Embodiments of the present disclosure will be described below with reference to the drawings.

First Embodiment

Figure 1:
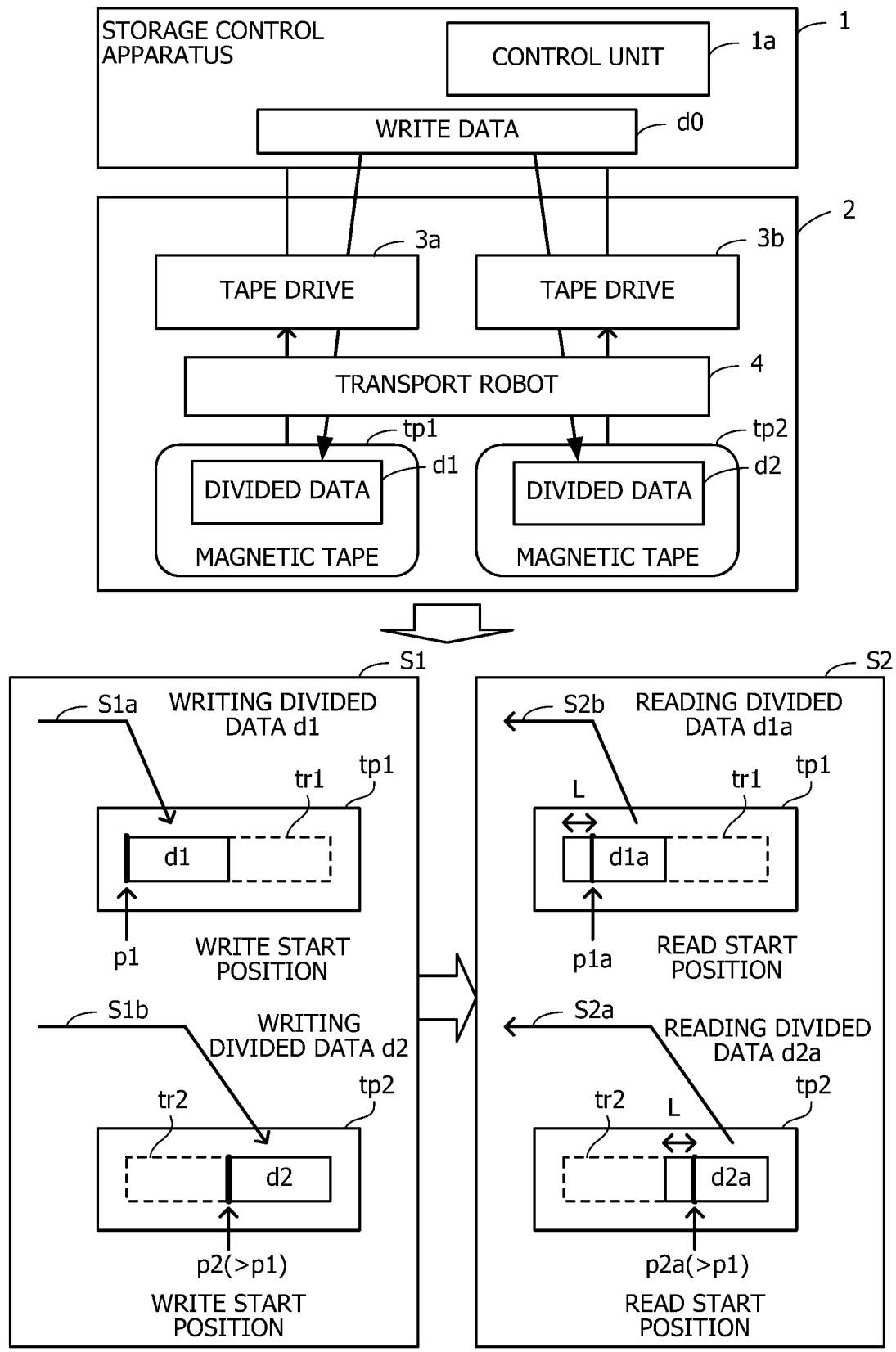
FIG. 1 is a diagram illustrating a configuration example and a processing example of a tape storage system according to a first embodiment.

FIG. 1 is a diagram illustrating a configuration example and a processing example of a tape storage system according to a first embodiment. A tape storage system illustrated in FIG. 1 includes a storage control apparatus 1 and a tape apparatus 2.

The storage control apparatus 1 performs control of the tape apparatus 2 to execute reading and writing of data using a magnetic tape. The storage control apparatus 1 includes a control unit 1a. For example, the control unit 1a is realized by a processor (not illustrated) included in the storage control apparatus 1.

The tape apparatus 2 includes a plurality of tape drives. As an example in the present embodiment, the tape apparatus 2 includes two tape drives 3a and 3b. The tape apparatus 2 further includes a transport robot 4, and mounting and unmounting of the magnetic tape on and from the tape drives 3a and 3b are executed by the transport robot 4. The magnetic tape may be transported by the transport robot 4 in a state of being stored in a tape cartridge.

By using the plurality of tape drives 3a and 3b as described above, the storage control apparatus 1 performs control of the tape apparatus 2 so that write data d0 requested to be written is striped and written to a plurality of magnetic tapes tp1 and tp2. In the striping, the write data d0 is divided into a predetermined size and distributed to the magnetic tapes tp1 and tp2, so that the write data d0 is written to the magnetic tapes tp1 and tp2 in a distributed manner. According to such striping, since writing and reading of the write data d0 is performed in parallel by the plurality of tape drives 3a and 3b, a time taken for the writing and reading may be shortened.

However, since the number of transport robots 4 is smaller (for example, only one) than the number of tape drives, the magnetic tapes tp1 and tp2 are sequentially mounted on the tape drives 3a and 3b by the transport robot 4. For example, when a mounting order is an order of the magnetic tapes tp1 and tp2, first, the magnetic tape tp1 is mounted on the tape drive 3a, and after the mounting is completed, the magnetic tape tp2 is mounted on the tape drive 3b.

For this reason, in a case where the write data d0 is to be read from the magnetic tapes tp1 and tp2, the earliest time at which the reading of data may be started differs between the magnetic tape tp1 and the magnetic tape tp2. For example, reading from the magnetic tape tp1 is started first, and then reading from the magnetic tape tp2 is started. At a time point at which the reading from the magnetic tape tp1 is completed, the reading from the magnetic tape tp2 is not completed. As described above, the entire reading time is lengthened by an amount by which a period in which reading is executed is shifted between the magnetic tapes tp1 and tp2.

Depending on a range of the write data d0 for which reading is designated, seeking by the magnetic head is performed after the magnetic tape is loaded. In this case, the reading time is further lengthened by the time taken for seeking.

At the time of writing by the striping in the related art, normally, write data is written to each magnetic tape from the same write start position (in many cases, from the head). In this case, when a reading range is designated from the write data, a head position of the data in the reading range is the same in each magnetic tape. For this reason, regardless of which range is designated as the reading range, the time taken for seeking is the same for each magnetic tape.

By contrast, the storage control apparatus 1 according to the present embodiment changes the data write start position for each magnetic tape so that the seek time differs for each magnetic tape at the time of reading. At the time of reading, the storage control apparatus 1 performs control of the tape apparatus 2 so as to start reading first from a magnetic tape having a long seek time, thereby shortening the entire reading time.

Hereinafter, a processing example of the storage control apparatus 1 will be described with reference to FIG. 1. In the following description, in the write data d0, data to be written to the magnetic tape tp1 is referred to as divided data d1, and data to be written to the magnetic tape tp2 is referred to as divided data d2. It is assumed that the magnetic tape tp1 is mounted on the tape drive 3a, the magnetic tape tp2 is mounted on the tape drive 3b, and the mounting is performed in an order of the magnetic tapes tp1 and tp2. It is assumed that storage capacities of the magnetic tapes tp1 and tp2 are the same. As an example, it is assumed that the magnetic tape tp1 includes a track tr1, the magnetic tape tp2 includes a track tr2, and each size of the tracks tr1 and tr2 is the same.

The write processing of the write data d0 to the magnetic tapes tp1 and tp2 (step S1) is performed as follows. First, the control unit 1a of the storage control apparatus 1 calculates a write start position p1 of the divided data d1 on the magnetic tape tp1 and a write start position p2 of the divided data d2 on the magnetic tape tp2. These write start positions p1 and p2 are calculated based on the number of magnetic tapes that serve as write destinations of the write data d0, a track size of one track in the magnetic tapes tp1 and tp2, and a mounting order of the magnetic tapes tp1 and tp2 so as to be different positions for each of the magnetic tapes tp1 and tp2.

For example, the write start position is set to a position closer to the head of the magnetic tape as the magnetic tape is mounted first in the mounting order. For example, in this case, a head position of the track tr1 of the tape tp1 is calculated as the write start position p1 in the tape tp1, and the position on an end side of the tape from the write start position p1 in the track tr2 of the tape tp2 is calculated as the write start position p2 in the tape tp2. When the position over the track is indicated by an address from the head of the tape, p2>p1.

For example, the write start positions p1 and p2 may be calculated based on the number of tapes and the track size so that the write start positions in the track are uniformly distributed among the magnetic tapes. For example, when the number of tapes is two as illustrated in FIG. 1, the write start position p2 may be calculated as a position that is ½ of the track size. Although not illustrated, for example, in a case where the number of tapes is three, the write start position on the second magnetic tape may be set to a position that is ⅓ of the track size from the tape head, and the write start position in the third magnetic tape may be set to a position that is ⅔ of the track size from the tape start.

When the control unit 1a calculates the write start positions p1 and p2 in this manner, the control unit 1a instructs the tape apparatus 2 to write the divided data d1 from the write start position p1 in the track tr1 of the magnetic tape tp1. The control unit 1a instructs the tape apparatus 2 to write the divided data d2 from the write start position p2 in the track tr2 of the magnetic tape tp2.

According to such an instruction, in the tape apparatus 2, first, the magnetic tape tp1 is mounted on the tape drive 3a by the transport robot 4, and the writing of the divided data d1 is started from the write start position p1 of the track tr1 (step S1a). After the mounting of the magnetic tape tp1 is completed, the magnetic tape tp2 is mounted on the tape drive 3b by the transport robot 4, and the writing of the divided data d2 is started from the write start position p2 of the track tr2 (step S1b).

On the other hand, the read processing of the write data d0 (step S2) is performed as follows. After the reading range is designated from the write data d0, the control unit 1a specifies a read start position indicating the head position of the data in the reading range for each of the magnetic tapes tp1 and tp2.

Here, as an example, it is assumed that a range from a position after a length L from the head of the write data d0 to the end of the data is designated as the reading range. Of the divided data d1 and d2 written to the magnetic tapes tp1 and tp2, data included in the reading range is referred to as divided data d1a and d2a, respectively. In this case, a read start position p1a for the magnetic tape tp1 is a position rearward of the write start position p1 by the length L, and a read start position p2a for the magnetic tape tp2 is a position rearward of the write start position p2 by the length L.

Next, the control unit 1a instructs the tape apparatus 2 to sequentially read the data in the reading range from the magnetic tape of which the read start position is close to the end of the tape between the magnetic tapes tp1 and tp2. In the example of FIG. 1, since the read start position p2a of the magnetic tape tp2 is closer to the end of the tape between the magnetic tapes tp1 and tp2, the tape apparatus 2 is instructed to read the magnetic tapes tp2 and tp1 in this order.

According to such an instruction, in the tape apparatus 2, first, the magnetic tape tp2 is mounted on the tape drive 3b by the transport robot 4, and after the mounting is completed, the magnetic tape tp1 is mounted on the tape drive 3a by the transport robot 4. When the magnetic tape tp2 is mounted, the tape drive 3b starts reading the divided data d2a from the read start position p2a of the track tr2 (step S2a). When the magnetic tape tp1 is mounted, the tape drive 3a starts reading the divided data d1a from the read start position p1a of the track tr1 (step S2b).

However, when the magnetic tape tp2 is mounted, the tape drive 3b actually seeks the magnetic head to the read start position p2a, and starts reading the divided data d2a after the seeking is completed. On the other hand, while the seeking for the magnetic tape tp2 is being performed, mounting of the magnetic tape tp1 by the transport robot 4 is performed in parallel. When the mounting is completed, the tape drive 3a seeks the magnetic head to the read start position p1a, and after the seeking is completed, starts reading the divided data d1a.

The seek time for the magnetic tape tp2 is longer than the seek time for the magnetic tape tp1. For this reason, by mounting the magnetic tape tp2 first as described above, it is possible to mount the other magnetic tape tp1, and seek the magnetic tape tp1 in some cases in parallel, during the long seek time for the magnetic tape tp2. As a result, the time for the entire read processing may be shortened as compared with the case where both the divided data d1 and d2 are written from the head position of the tape.

Although such an effect of shortening the reading time does not occur when reading is performed from the head of the write data d0, the effect of shortening the reading time necessarily occurs when reading from a position after the head of the write data d0. Since it is considered that the head position of the write data d0 in the reading range is randomly designated, the average reading time may be shortened by the above-described processing.

Second Embodiment

Next, a tape storage system having the function of the storage control apparatus 1 described above will be described as a second embodiment. According to the second embodiment, for example, a case where a magnetic tape capable of reading and writing data in both a forward direction and a backward direction is used will be described.

Figure 2:
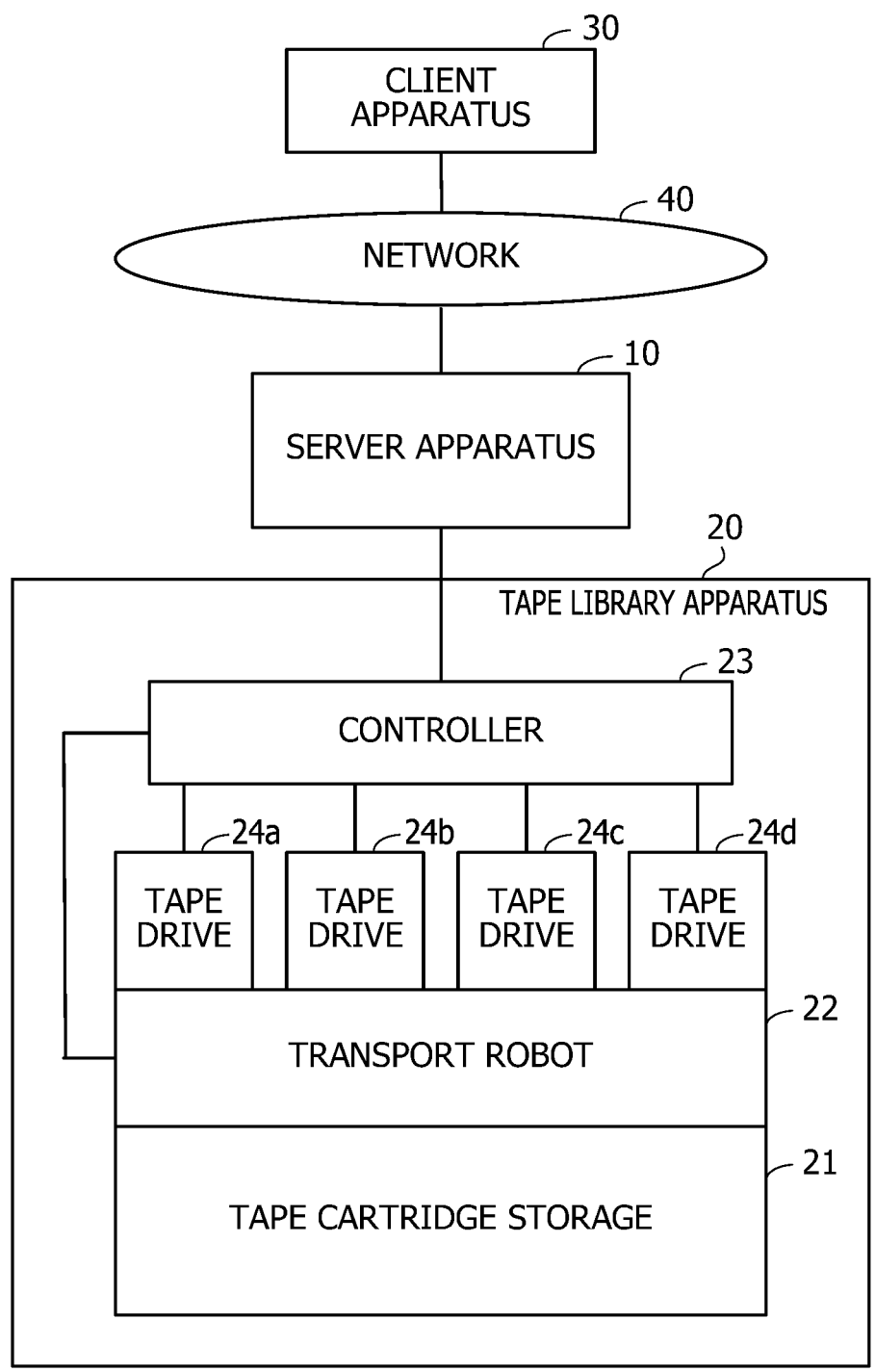
FIG. 2 is a diagram illustrating an example of a configuration of a tape storage system.

FIG. 2 is a diagram illustrating an example of a configuration of a tape storage system. The tape storage system illustrated in FIG. 2 includes a server apparatus 10, a tape library apparatus 20, and a client apparatus 30. For example, the server apparatus 10 is coupled to the tape library apparatus 20 via a storage area network (SAN) (not illustrated) by a Fibre Channel (FC) or an Internet Small Computer Systems Interface (iSCSI). The server apparatus 10 is coupled to the client apparatus 30 via a network 40 such as a local area network (LAN).

The tape library apparatus 20 is an example of the tape apparatus 2 illustrated in FIG. 1. The tape library apparatus 20 includes a tape cartridge storage 21, a transport robot 22, a controller 23, and a plurality of tape drives. As an example in FIG. 2, the tape library apparatus 20 includes four tape drives 24a to 24d.

The tape cartridge storage 21 includes a storage shelf including a plurality of slots. A tape cartridge is stored in each slot of the storage shelf. A magnetic tape is accommodated in each tape cartridge.

Under the control of the controller 23, the transport robot 22 transports the tape cartridge. For example, the transport robot 22 transports and loads the tape cartridge stored in the tape cartridge storage 21 to any one of the tape drives 24a to 24d. The transport robot 22 unloads the tape cartridge from the tape drives 24a to 24d, transports the tape cartridge to the tape cartridge storage 21, and stores the tape cartridge in the slot.

In response to a request from the server apparatus 10, the controller 23 controls a data reading and writing operation by the tape drives 24a to 24d and a tape cartridge transport operation by the transport robot 22.

The tape drives 24a to 24d write data transferred from the controller 23 to the loaded magnetic tape by using a magnetic head. The tape drives 24a to 24d read the data from the loaded magnetic tape by using the magnetic head, and transfers the read data to the controller 23. In the present embodiment, the tape library apparatus 20 includes the plurality of tape drives 24a to 24d, and the respective tape drives 24a to 24d make it possible to write data to the magnetic tape and read data from the magnetic tape in parallel.

The client apparatus 30 transmits stream data of a moving image or a sound to the server apparatus 10 and requests the server apparatus 10 to write the stream data to the magnetic tape. For example, the client apparatus 30 compresses and encodes the moving image data obtained by photographing with the camera to generate moving image stream data, and transmits the moving image stream data to the server apparatus 10. The client apparatus 30 requests the server apparatus 10 to read the stream data written on the magnetic tape. Each of the stream data write request and the stream data read request may be transmitted from a separate apparatus to the server apparatus 10.

The server apparatus 10 is an example of the storage control apparatus 1 illustrated in FIG. 1. Based on a request from the client apparatus 30, the server apparatus 10 reads and writes data from and to the magnetic tape stored in the tape library apparatus 20. For example, the server apparatus 10 transmits a tape volume name to be accessed, and the read or write request to the tape library apparatus 20. At this time, under the control of the controller 23 that has received the request, the tape library apparatus 20 acquires the tape cartridge corresponding to the received tape volume name from the tape cartridge storage 21, loads the tape cartridge to the tape drives 24a to 24d, and performs control of reading or writing of data in accordance with the request.

Figure 3:
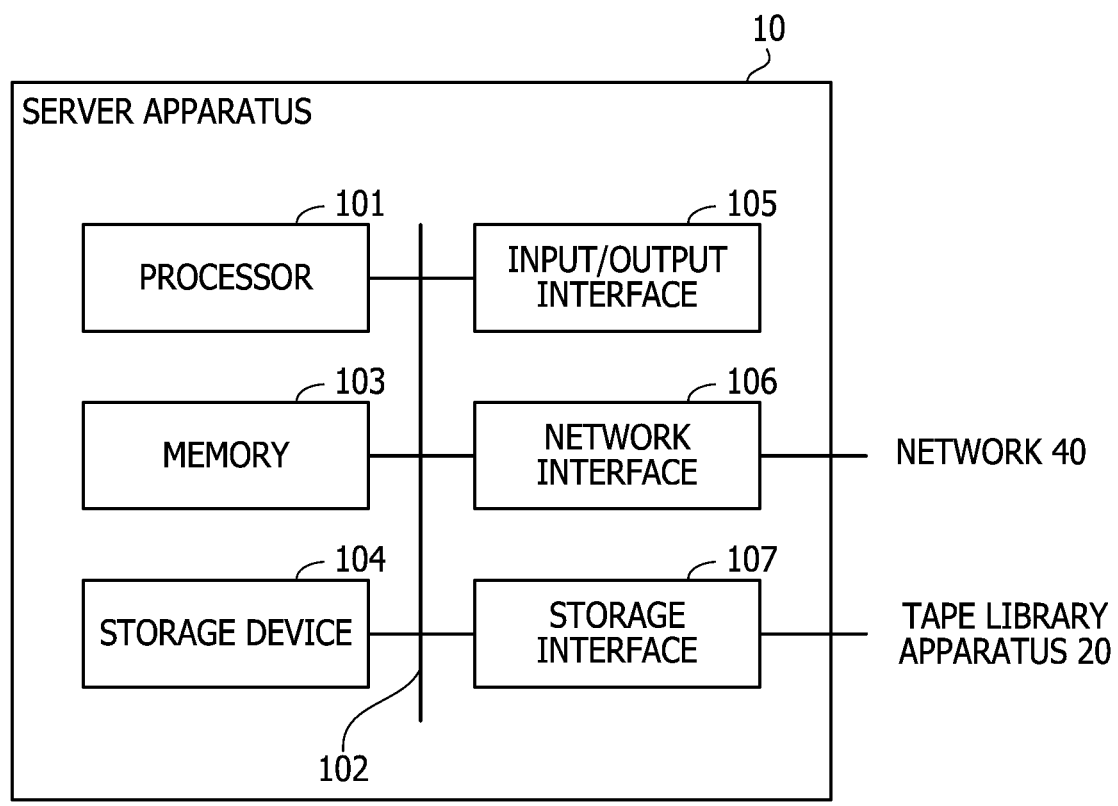
FIG. 3 is a diagram illustrating an example of a hardware configuration of a server apparatus.

FIG. 3 is a diagram illustrating an example of a hardware configuration of a server apparatus. The entirety of the server apparatus 10 is controlled by a processor 101. A memory 103, a storage device 104, an input/output interface 105, a network interface 106, and a storage interface 107 are coupled to the processor 101 via a bus 102.

For example, the processor 101 is a central processing unit (CPU), a field-programmable gate array (FPGA), a microprocessor unit (MPU), a digital signal processor (DSP), an application-specific integrated circuit (ASIC), or a programmable logic device (PLD). The processor 101 may be a multiprocessor. For example, the processor 101 may be a combination of two or more elements of the CPU, the FPGA, the MPU, the DSP, the ASIC, and the PLD.

The memory 103 is a volatile storage device that is used as a main storage device of the server apparatus 10. The memory 103 temporarily stores at least a part of an operating system (OS) program or an application program to be executed by the processor 101. The memory 103 also stores various kinds of data used in processing by the processor 101. For example, the memory 103 is realized as a dynamic random-access memory (DRAM).

The storage device 104 is a nonvolatile storage device that is also used as an auxiliary storage device of the server apparatus 10. The storage device 104 stores the OS program, the application program, and various kinds of data. The storage device 104 is realized as, for example, a semiconductor storage device such as a flash memory and a solid-state drive (SSD), or a magnetic recording medium such as a hard disk drive (HDD).

The input/output interface 105 may be coupled to an information input device such as a keyboard or a mouse, and transmits a signal sent from the information input device to the processor 101. The input/output interface 105 is coupled to a display or a speaker and outputs image and sound information.

The input/output interface 105 also serves as a communication interface for coupling to peripheral equipment. For example, an optical drive device that uses laser light or the like to read data recorded on an optical disc may be coupled to the input/output interface 105. Examples of the optical disc include a compact disc (CD), a Digital Versatile Disc (DVD), a Blu-ray Disc (BD, registered trademark), and the like.

A memory device and a memory reader/writer may also be coupled to the input/output interface 105. The memory device is a recording medium having a function of communicating with the input/output interface 105. The memory reader/writer is a device that writes data to a memory card or reads data from the memory card. The memory card is a card-type recording medium.

The network interface 106 is coupled to the network 40 and performs network interface control. For example, a network interface card (NIC), a wireless local area network (LAN) card, and the like may be used as the network interface 106. Data received by the network interface 106 is output to the processor 101.

The storage interface 107 is coupled to the tape library apparatus 20 and performs storage interface control for communicating with the tape library apparatus 20.

With the hardware configuration as described above, processing functions of the server apparatus 10 may be implemented. For example, the server apparatus 10 may perform processing of the present embodiment by causing the processor 101 to execute a predetermined program.

The server apparatus 10 implements the processing functions of the present embodiment by, for example, executing a program recorded in a computer-readable recording medium. A program in which details of processing to be executed by the server apparatus 10 is described may be recorded in various recording media.

For example, the program to be executed by the server apparatus 10 may be stored in the auxiliary storage device. The processor 101 loads at least a part of the program in the auxiliary storage device into the main storage device and executes the program.

The program to be executed by the server apparatus 10 may be recorded on a portable-type recording medium such as an optical disc, a memory device, and a memory card. The program stored in the portable-type recording medium may be executed, for example, after being installed in the auxiliary storage device under the control of the processor 101. The processor 101 may read the program directly from the portable-type recording medium and execute the program.

By the way, as described above, the tape library apparatus 20 includes a plurality of tape drives 24a to 24d. The respective tape drives 24a to 24d make it possible to write data to the magnetic tape and read data from the magnetic tape in parallel. In such a configuration, the processing speed of writing and reading may be increased by striping data.

Figure 4:
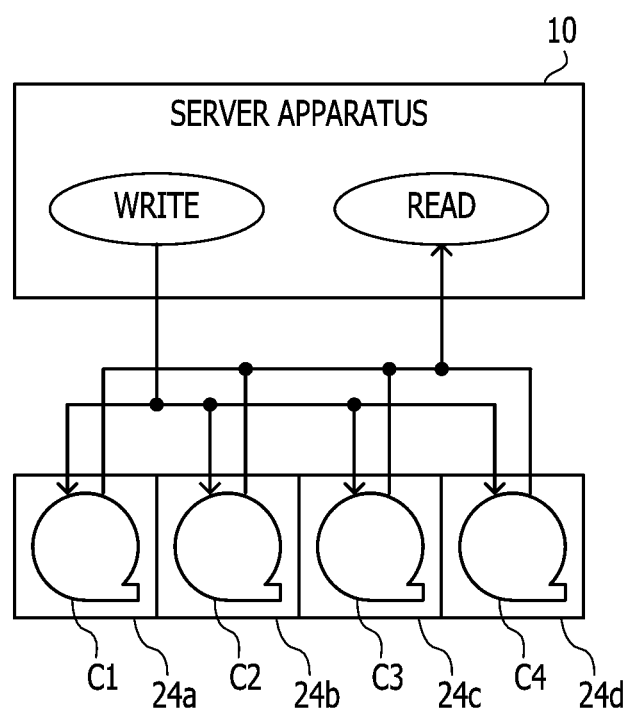
FIG. 4 is a diagram for explaining writing and reading of data by striping.

FIG. 4 is a diagram for explaining writing and reading of data by striping.

At the time of writing stream data, the server apparatus 10 performs striping of the stream data (data division processing) and writes the striped data to the magnetic tapes in the plurality of tape cartridges in parallel. For example, the stream data is divided into blocks of a predetermined size, and the blocks are sequentially distributed to the tape drives 24a to 24d on which a tape cartridges C1 to C4 are mounted, respectively. Accordingly, the stream data is written in a distributed manner to the magnetic tapes in each of the tape cartridges C1 to C4.

At the time of reading the stream data, the server apparatus 10 reads the stream data in a reproduction time slot designated by the client apparatus 30 from the magnetic tapes in the tape cartridges C1 to C4. In this case, the transport robot 22 loads the tape cartridges C1 to C4 into the tape drives 24a to 24d, respectively. The tape drives 24a to 24d read the data in the range designated to be read from the magnetic tapes in the tape cartridges C1 to C4 in parallel, respectively, and transfer the data to the server apparatus 10.

By combining the transferred data, the server apparatus 10 reconstructs the stream data in the designated reproduction time slot.

Next, the time taken to read data from the magnetic tape will be described.

Figure 5:
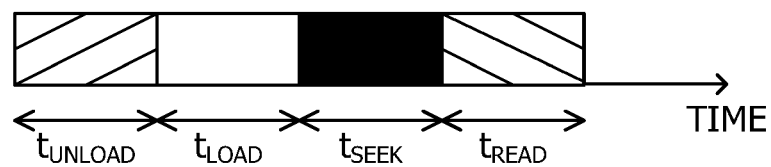
FIG. 5 is a diagram illustrating a breakdown of a reading time of a magnetic tape.

FIG. 5 is a diagram illustrating a breakdown of a reading time of a magnetic tape. As illustrated in FIG. 5, a time from when the server apparatus 10 requests the tape drive to read data until all the data to be read is read from the magnetic tape includes a time $t_{UNLOAD}$, a time $t_{LOAD}$, a time $t_{SEEK}$, and a time $t_{READ}$.

The time $t_{UNLOAD}$ is an unloading time of an old tape cartridge. For example, it is the time when the transport robot 22 takes out the old tape cartridge from the tape drive and accommodates the old tape cartridge in the tape cartridge storage 21. A time for rewinding the old tape cartridge to the head is not included. Hereinafter, it is assumed that the time $t_{UNLOAD}$ is predetermined.

The time $t_{LOAD}$ is a loading time of a new tape cartridge. For example, it is a time for the transport robot 22 to take out the new tape cartridge from the tape cartridge storage 21 and store the new tape cartridge in the tape drive. Hereinafter, it is assumed that the time $t_{LOAD}$ is predetermined.

The time $t_{SEEK}$ is a positioning time when the tape head is moved from a tape start to be read to a head of data. The time $t_{SEEK}$ varies depending on a head address (linear position (LPOS)) of the data to be read.

The time $t_{READ}$ is a reading time of data in which data is actually read from the magnetic tape. The time $t_{READ}$ varies depending on an amount of data to be read. The time $t_{READ}$ of each tape cartridge is the same in the reading of the striped data.

Figure 6:
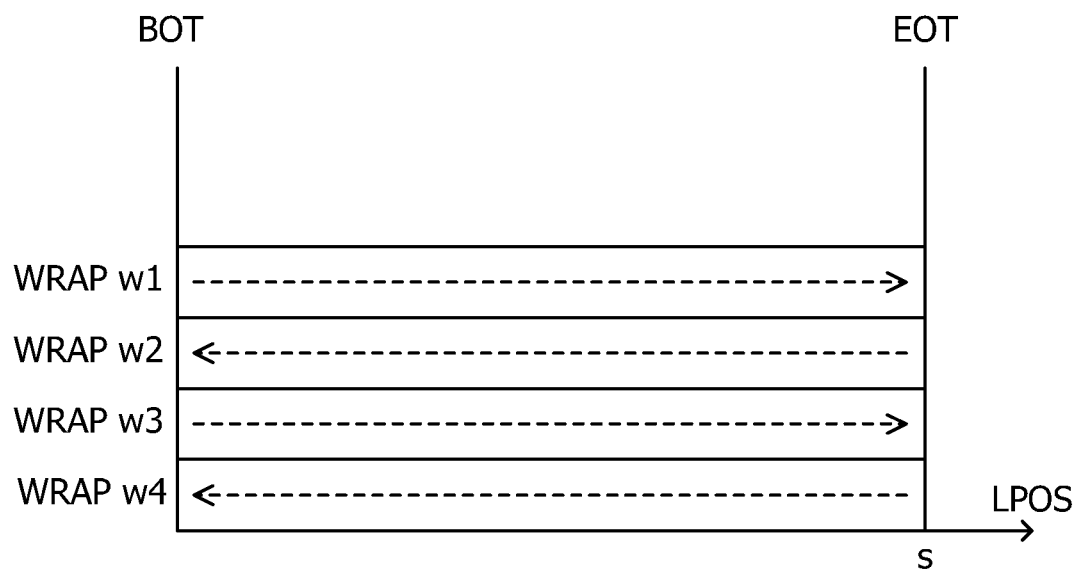
FIG. 6 is a diagram for explaining a linear position (LPOS)

FIG. 6 is a diagram for explaining the LPOS. As a standard of the magnetic tape, Linear Tape-Open (LTO) is widely used, and in the LTO, a magnetic tape is provided with a plurality of horizontal regions called wraps. FIG. 6 illustrates an example of wraps w1 to w4. Actually, each of the wraps w1 to w4 includes a plurality of tracks on which reading and writing are simultaneously performed. For this reason, each of the wraps w1 to w4 may also be regarded as a track.

When the server apparatus 10 reads the entire magnetic tape in the tape cartridge, the tape drive starts reading from a beginning of tape (BOT) of a first wrap. When the tape drive reaches an end of tape (EOT) of the wrap, the tape drive moves to the next wrap, changes a traveling direction, and performs reading from the EOT to the BOT. When the tape drive reaches the BOT, the tape drive moves to the next wrap, changes the traveling direction, and continues reading. As described above, the tape drive performs reading while switching the traveling direction every time the tape drive moves between the wraps, and ends the reading at the BOT of the last wrap. In the example of FIG. 6, the wraps w1 and w3 are forward wraps in which the tape head travels in a forward direction, and the wraps w2 and w4 are backward wraps in which the tape head travels in a backward direction.

The LPOS represents an address of a position in a horizontal direction (track direction) in the wrap, and the BOT is the minimum LPOS and the EOT is the maximum LPOS regardless of the traveling direction of the tape head in the wrap. Hereinafter, a wrap size is referred to as s in some cases. In this case, the LPOS at the BOT is 0, and the LPOS at the EOT is s.

Since the time $t_{SEEK}$ illustrated in FIG. 5 is a time taken for the tape head to move from the BOT to the head of the data, the smaller a head LPOS of the data to be read, the shorter the time $t_{SEEK}$, regardless of the wrap. For this reason, when the amounts of data to be read are the same, the smaller the head LPOS, the shorter the total time taken for reading.

Figure 7:
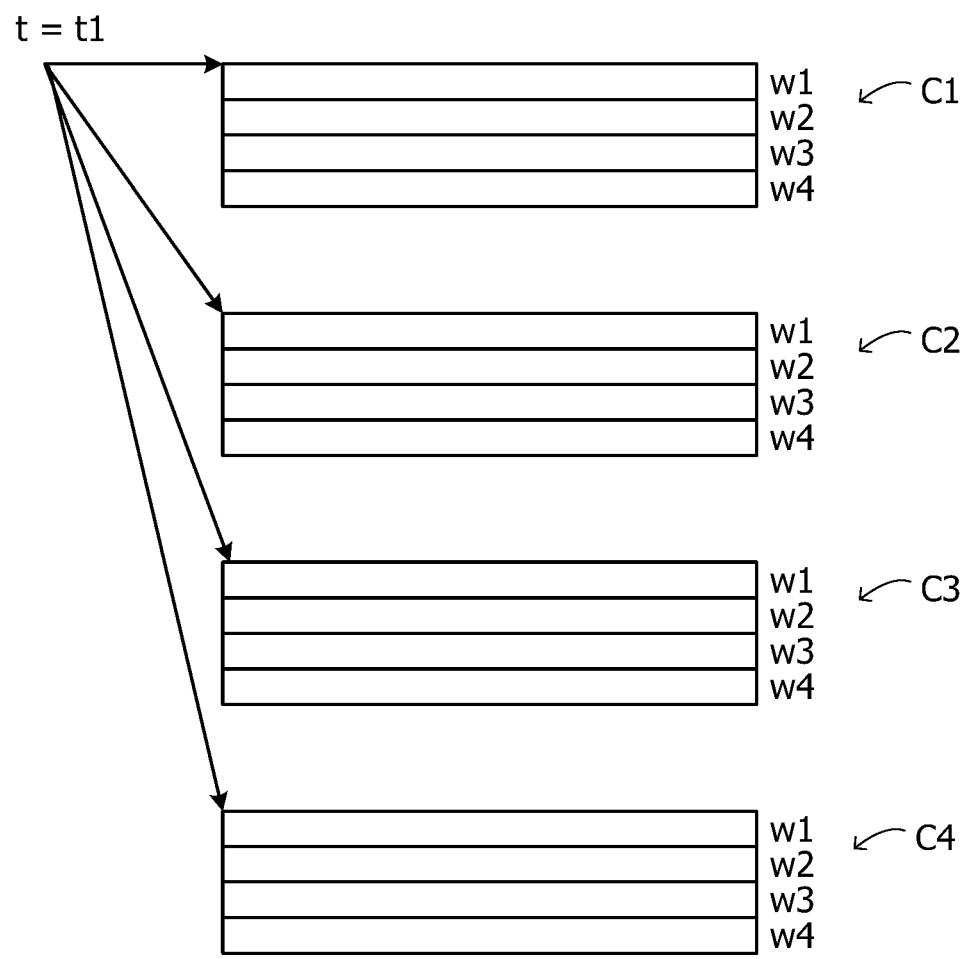
FIG. 7 is a diagram illustrating a comparative example of data write processing.

FIG. 7 is a diagram illustrating a comparative example of data write processing. In many cases, in the data write processing, data starts to be written from the heads (BOT of the first wrap) of the magnetic tapes in all the tape cartridges. In this case, data in the same reproduction time slot in the stream data is written to the same LPOS sections of all the tape cartridges. For the example illustrated in FIG. 7, data of a time t0 indicating that the reproduction time is 0 (head) is written to the wraps w1 of each of the tape cartridges C1 to C4 where LPOS=0.

Figure 8:
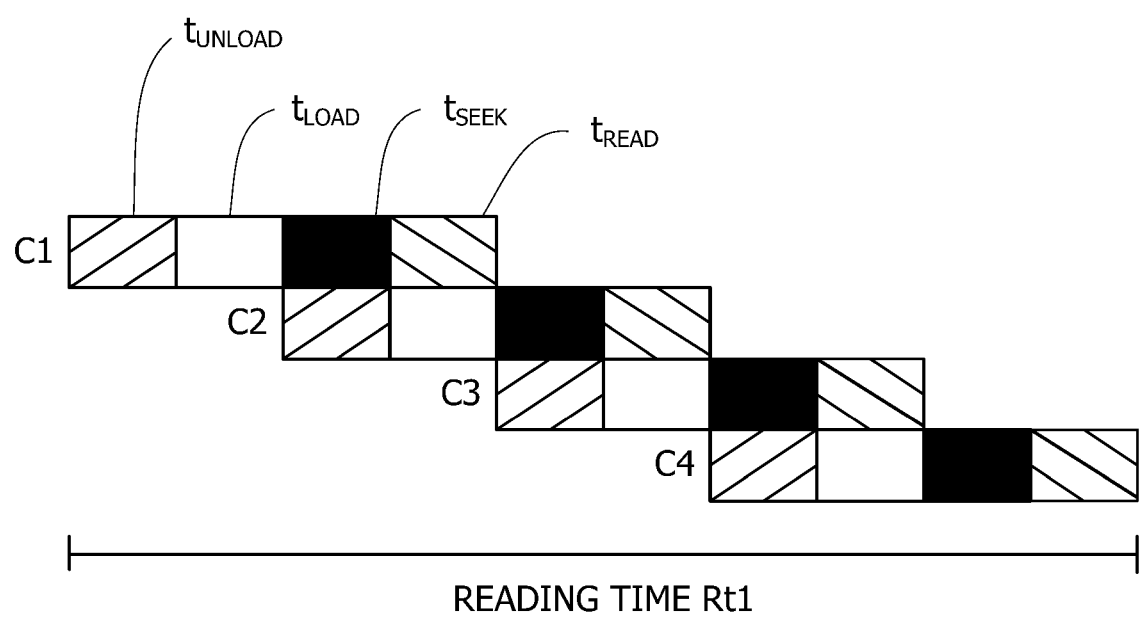
FIG. 8 is a diagram illustrating a comparative example of a data reading time.

FIG. 8 is a diagram illustrating a comparative example of a data reading time. FIG. 8 illustrates a reading time in a case where data is written to the same write start position on the magnetic tape for each tape cartridge as described above with reference to FIG. 7. In FIG. 8, $(t_{UNLOAD}+t_{LOAD})$ looks equal to $(t_{SEEK}+t_{READ})$, but they are not always equal to each other.

When the reproduction time slot to be read is designated from the stream data, the server apparatus 10 instructs the tape library apparatus 20 to read the corresponding data from the tape cartridges C1 to C4. As an example in FIG. 8, it is assumed that data is read in order of the tape cartridges C1, C2, C3, and C4 by the tape drives 24a, 24b, 24c, and 24d, respectively. In this case, since the number of transport robot 22 in the tape library apparatus 20 is one, the tape cartridges C1 to C4 are serially read.

For example, unloading of the old tape cartridge is performed from the tape drive 24a, and when the unloading is completed, the tape cartridge C1 is loaded into the tape drive 24a. When the loading is completed, reading of the data from the tape cartridge C1 is started, and in parallel with this, unloading of the old tape cartridge from the tape drive 24b is performed. When the unloading is completed, the tape cartridge C2 is loaded into the tape drive 24b. When the loading is completed, reading of the data from the tape cartridge C2 is started, and in parallel with this, unloading of the old tape cartridge from the tape drive 24c is performed. When the unloading is completed, the tape cartridge C3 is loaded into the tape drive 24c. When the loading is completed, reading of the data from the tape cartridge C3 is started, and in parallel with this, unloading of the old tape cartridge from the tape drive 24d is performed. When the unloading is completed, the tape cartridge C4 is loaded into the tape drive 24d. When the loading is completed, the data reading from the tape cartridge C4 is started.

Until all pieces of data from each of the magnetic tapes of the tape cartridges C1 to C4 are collected, the restoration of original data may not be completed. For this reason, the data reading time is a time from when the first tape drive is instructed to read data to when the last tape drive finishes reading data. Accordingly, a reading time Rt1 when the data is read as described above is represented by the following formula (1). $t(C4)_{SEEK}$ indicates the time $t_{SEEK}$ in the tape cartridge C4.

$$Rt1=4\times(t_{UNLOAD}+t_{LOAD})+t(C4)_{SEEK}+t_{READ} \quad (1)$$

The time $t(C4)_{SEEK}$ varies from $t(C4)_{SEEK}=0$ (when the LPOS is the minimum) to $t(C4)_{SEEK}=t_{SEEK(MAX)}$ (when the LPOS is the maximum), depending on the head LPOS of the read data. In a case where writing is performed by the method illustrated in FIG. 7, regardless of which reproduction time slot to be read is designated, the head LPOS of the read data is the same for all the magnetic tapes, so the time $t_{SEEK}$ is also the same for all the magnetic tapes.

Accordingly, in a case where the data written by striping is read from the tape cartridges C1 to C4, a minimum value $Rt1_{MIN}$, an average value $Rt1_{AVG}$, and a maximum value $Rt1_{MAX}$ of the reading time Rt1 are represented by the following formulae (2a), (2b), and (2c), respectively.

$$Rt1_{MIN}=4\times(t_{UNLOAD}+t_{LOAD})+t_{READ} \quad (2a)$$

$$Rt1_{AVG}=4\times(t_{UNLOAD}+t_{LOAD})+t_{SEEK(MAX)}/2+t_{READ} \quad (2b)$$

$$Rt1_{MAX}=4\times(t_{UNLOAD}+t_{LOAD})+t_{SEEK(MAX)}+t_{READ} \quad (2c)$$

Since an administrator may read data at arbitrary time, the head LPOS of the read data is in many cases a random value between 0 and s. The average value $Rt1_{AVG}$ described above is a calculated value in a case of assuming that the head LPOS of the read data is randomly designated.

As in the example illustrated in FIG. 2, since one transport robot 22 is in many cases provided in the tape library apparatus 20, at least the loading operation of the magnetic tape by the transport robot 22 becomes a bottleneck for shortening the reading time when the reading is performed by striping from the plurality of tape cartridges. For this reason, as illustrated in FIG. 7, in a case where data is written to the magnetic tape of each tape cartridge from the same write start position, there is a problem that an average reading time is extended by a time taken for a loading operation of the magnetic tape, and an unloading operation in some cases.

For such a problem, in the present embodiment, the average reading time is shortened by shortening the time $t_{SEEK(MAX)}$ included in the formula (2b). For example, in the above-described comparative example, since the write start position of the data is the same on each magnetic tape, the seek time (time $t_{SEEK}$) at the time of reading is also the same on each magnetic tape. By contrast, in the present embodiment, the data write start position is changed for each magnetic tape so that the seek time differs for each magnetic tape at the time of reading. At the time of reading, control is performed such that reading is started first from a magnetic tape having a long seek time, thereby shortening the entire reading time.

Figure 9:
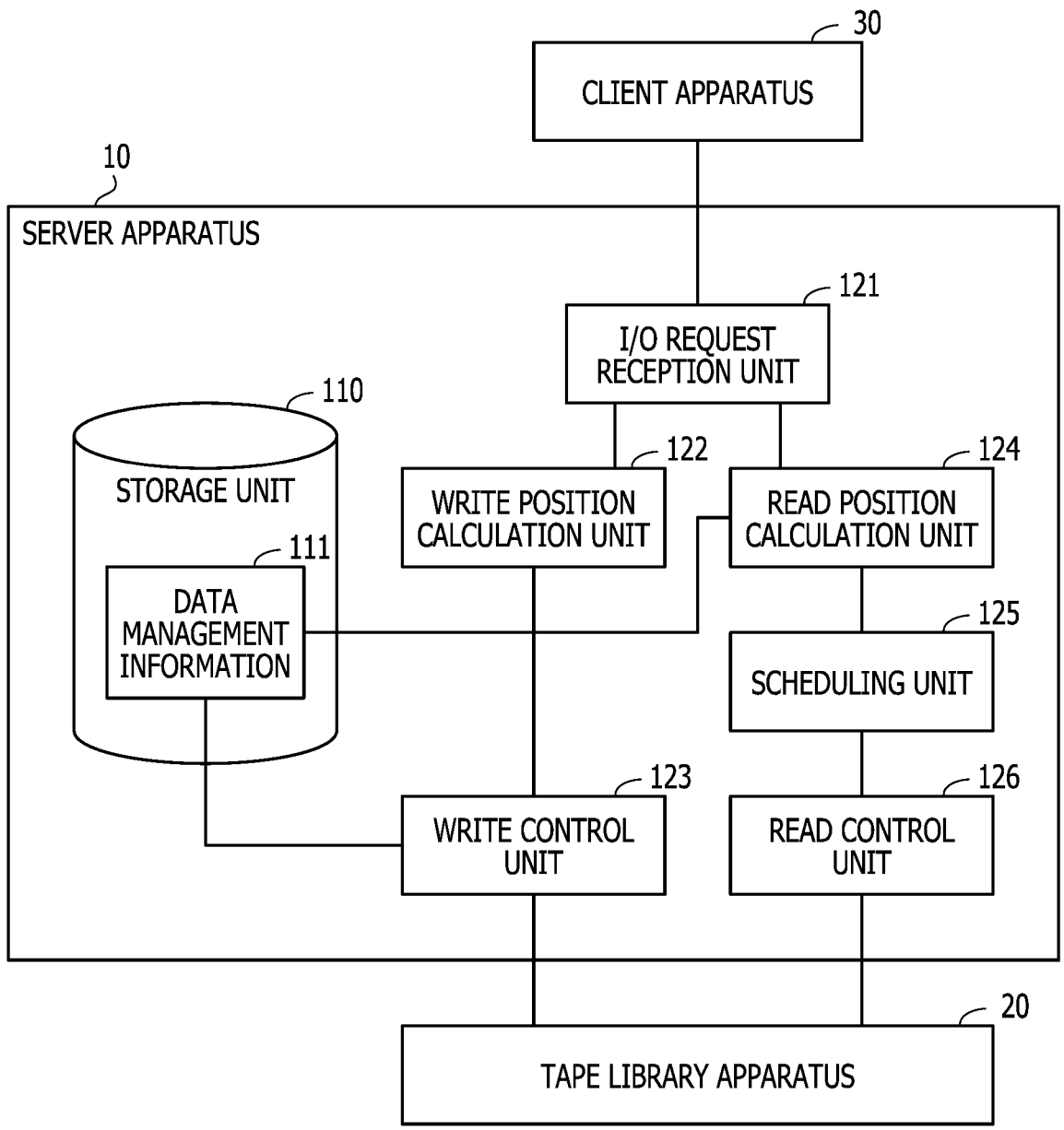
FIG. 9 is a diagram illustrating a configuration example of processing functions included in a server apparatus according to a second embodiment.

FIG. 9 is a diagram illustrating a configuration example of processing functions included in the server apparatus according to the second embodiment. As illustrated in FIG. 9, the server apparatus 10 includes a storage unit 110, an input/output (I/O) request reception unit 121, a write position calculation unit 122, a write control unit 123, a read position calculation unit 124, a scheduling unit 125, and a read control unit 126.

For example, the storage unit 110 is realized as a storage area of a storage device included in the server apparatus 10, such as the memory 103 and the storage device 104. Data management information 111 is stored in the storage unit 110. For each tape cartridge, information indicating a correspondence relationship between a reproduction time of stored data and a write position on a magnetic tape is recorded in the data management information 111.

Processing of the I/O request reception unit 121, the write position calculation unit 122, the write control unit 123, the read position calculation unit 124, the scheduling unit 125, and the read control unit 126 is realized by, for example, the processor 101 executing a predetermined program.

The I/O request reception unit 121 receives an I/O request (a write request or a read request) from the client apparatus 30.

The write position calculation unit 122 calculates a write start position for each tape cartridge when stream data requested to be written is written by striping.

The write control unit 123 instructs the tape library apparatus 20 to write the striped data from the write start position calculated for each tape cartridge. The write control unit 123 registers information indicating the correspondence relationship between the reproduction time and the write position in the data management information 111.

The read position calculation unit 124 calculates the data read start position for each tape cartridge while referring to the data management information 111 based on the reproduction time slot to be read in the stream data, designated by the client apparatus 30.

The scheduling unit 125 determines a reading order of the tape cartridges based on the data read start position for each tape cartridge.

The read control unit 126 instructs the tape library apparatus 20 to read data from the read start position of each tape cartridge according to the determined reading order.

Next, data write processing will be described. Hereinafter, there are cases where an LPOS indicating a write start position is referred to as a write start LPOS, and an LPOS indicating a read start position is referred to as a read start LPOS.

At the time of data writing, the write position calculation unit 122 calculates a write start wrap and a write start LPOS for each tape cartridge so that the write start positions are uniformly distributed in a range of first and second wraps among the tape cartridges.

It is assumed that the number of tape cartridges is N, a tape cartridge number is i (i=1, 2, . . . , N), a wrap number of a write start wrap in an i-th tape cartridge is w(i), and a start LPOS of the i-th tape cartridge is P(i). At this time, the wrap number (w(i)) and the start LPOS (P(i)) of the write start wrap in the i-th tape cartridge are represented by the following formula (3a) or formula (3b) to correspond to the number i of the tape cartridge.

For a tape cartridge in which $2\times s\times(i-1)/N<s$, w(i) and P(i) are represented by the following formula (3a).

$$w(i)=1, P(i)=2\times s\times(i-1)/N \quad (3a)$$

In a tape cartridge in which $2\times s\times(i-1)/N \geq s$, w(i) and P(i) are represented by the following formula (3b).

$$w(i)=2, P(i)=2\times s-2\times s\times(i-1)/N \quad (3b)$$

The write control unit 123 instructs the tape library apparatus 20 to write data from the write start position calculated for each tape cartridge as described above. Since the write start position differs for each tape cartridge, the data write position corresponding to the same reproduction time also differs for each tape cartridge. Accordingly, the write position calculation unit 122 acquires the position where the data is written from the write control unit 123, and registers information indicating the correspondence relationship between the reproduction time and the write position in the data management information 111.

FIG. 10 is a diagram illustrating an example of a data management table. A data management table 111a as illustrated in FIG. 10 is registered for each tape cartridge in the data management information 111. The data management table 111a has each item of the wrap number and the LPOS in the magnetic tape of the corresponding tape cartridge, and the reproduction time for the written data.

FIG. 10 illustrates a registration example of data in a case where a record is recorded every time data is written by a size of s/10. FIG. 10 illustrates an example in which data of time t0 is written to wrap #1 where LPOS=0 and data of time t1 is written to wrap #1 where LPOS=s/10 for the tape cartridge C1. As described above, the server apparatus 10 registers and manages which reproduction time data is stored in which LPOS of which wrap in the data management table 111a, for each tape cartridge.

At the time of data reading, the read position calculation unit 124 of the server apparatus 10 calculates the wrap number and the LPOS in which data of arbitrary reproduction time t is stored in each tape cartridge by referring to the data management table 111a. In a case where there is no record of the designated reproduction time tin the data management table 111a, the read position calculation unit 124 calculates the LPOS in which the data of the reproduction time t to be read is stored, by linear interpolation based on the LPOS and the reproduction times of two records before and after the time t.

Next, specific examples of data write/read processing in a case where the write start position is determined by using the above formulae (3a) and (3b) will be described.

Figure 11:
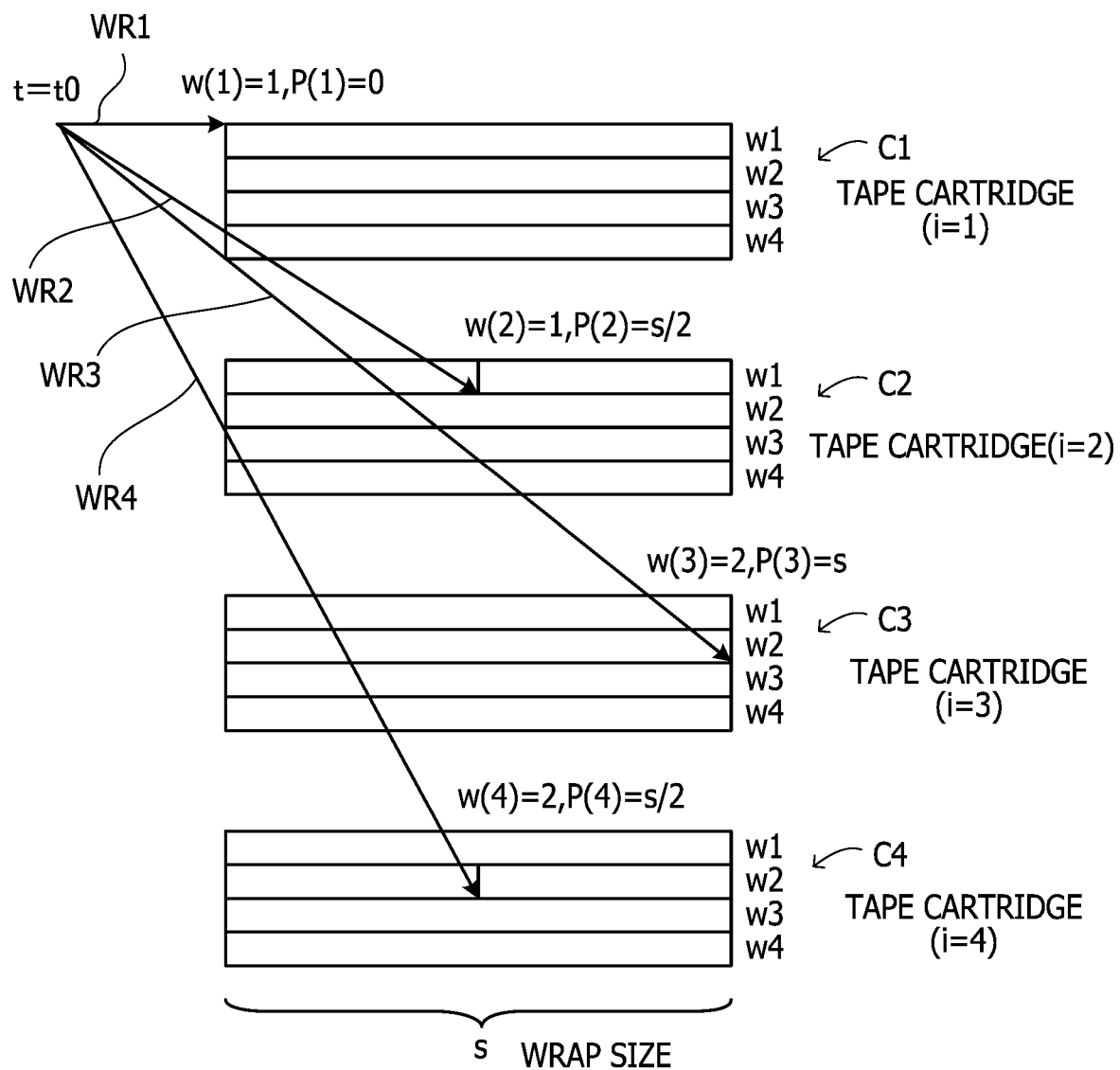
FIG. 11 is a diagram illustrating a first example of data write processing.

FIG. 11 is a diagram illustrating a first example of data write processing. FIG. 11 illustrates an example in a case where the number N of tape cartridges is 4. It is assumed that a data writing order is an order of the tape cartridges C1, C2, C3, and C4. In this case, the write position calculation unit 122 calculates a write start wrap and a write start LPOS for each of the tape cartridges C1 to C4 as follows.

The formula (3a) is applied for the tape cartridge C1 having the tape cartridge number i of 1, and w(1)=1 and P(1)=0 are calculated. For this reason, the write control unit 123 instructs the controller 23 of the tape library apparatus 20 to write data from the position of the wrap w1 where LPOS=0 in the tape cartridge C1 (write instruction WR1). According to the instruction, for example, the tape drive 24a starts writing data in a forward direction from the position of the wrap w1 where LPOS=0 in the tape cartridge C1.

The formula (3a) is applied for the tape cartridge C1 having the tape cartridge number i of 2, and w(2)=1 and P(2)=s/2 are calculated. For this reason, the write control unit 123 instructs the controller 23 of the tape library apparatus 20 to write data from the position of the wrap w1 where LPOS=s/2 in the tape cartridge C2 (write instruction WR2). According to the instruction, for example, the tape drive 24b starts writing data in a forward direction from the position of the wrap w1 where LPOS=s/2 in the tape cartridge C2.

The formula (3b) is applied for the tape cartridge C3 having the tape cartridge number i of 3, and w(3)=2 and P(3)=s are calculated. For this reason, the write control unit 123 instructs the controller 23 of the tape library apparatus 20 to write data from the position of the wrap w2 where LPOS=s in the tape cartridge C3 (write instruction WR3). According to the instruction, for example, the tape drive 24c starts writing data in a backward direction from the position of the wrap w2 where LPOS=s in the tape cartridge C3.

The formula (3b) is applied for the tape cartridge C4 having the tape cartridge number i of 4, and w(4)=2 and P(4)=s/2 are calculated. For this reason, the write control unit 123 instructs the controller 23 of the tape library apparatus 20 to write data from the position of the wrap w2 where LPOS=s/2 in the tape cartridge C4 (write instruction WR4). According to the instruction, for example, the tape drive 24d starts writing data in a backward direction from the position of the wrap w2 where LPOS=s/2 in the tape cartridge C4.

Figure 12:
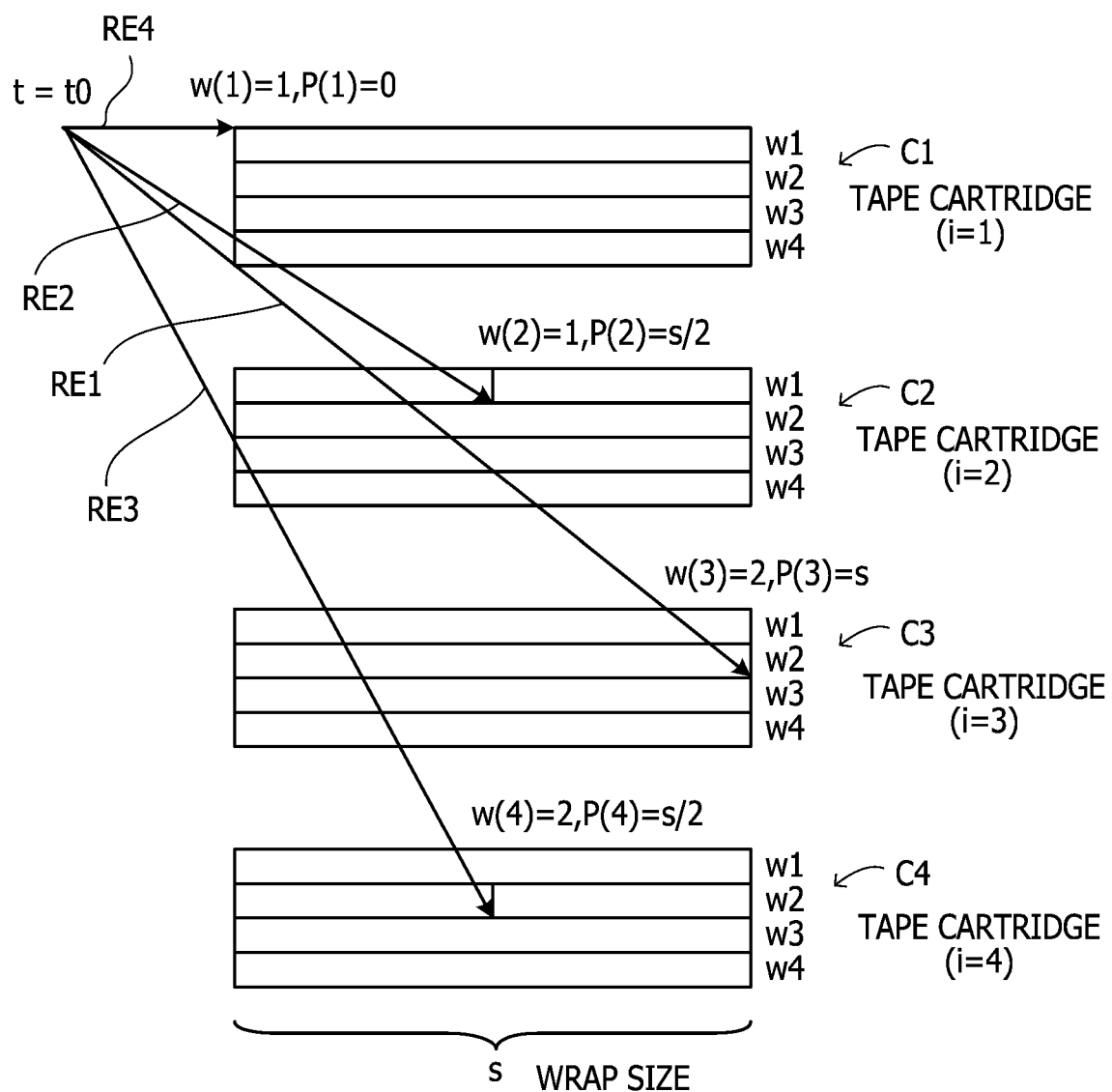
FIG. 12 is a diagram illustrating a first example of data read processing.

FIG. 12 is a diagram illustrating a first example of data read processing. FIG. 12 illustrates an example of the read processing in a case where the data is written to the tape cartridges C1 to C4 as illustrated in FIG. 11. Here, as an example, it is assumed that reading from the reproduction time t=t0 indicating the head of the stream data is requested.

The read position calculation unit 124 calculates the read start wrap as wrap w1 and the read start LPOS as 0 based on the corresponding data management table 111a for the tape cartridge C1 having the tape cartridge number i of 1.

The read position calculation unit 124 calculates the read start wrap as wrap w1 and the read start LPOS as s/2 based on the corresponding data management table 111a for the tape cartridge C2 having the tape cartridge number i of 2.

The read position calculation unit 124 calculates the read start wrap as wrap w2 and the read start LPOS as s based on the corresponding data management table 111a for the tape cartridge C3 having the tape cartridge number i of 3.

The read position calculation unit 124 calculates the read start wrap as wrap w2 and the read start LPOS as s/2 based on the corresponding data management table 111a for the tape cartridge C4 having the tape cartridge number i of 4.

Next, the scheduling unit 125 determines a reading order in the tape cartridges C1 to C4 based on the read start LPOS. At the time of reading, by performing control such that reading is started first from a tape cartridge having a long seek time, it is possible to shorten the seek time in the tape cartridge to be read last, and as a result, to shorten the entire reading time. As the value of the read start LPOS is larger (for example, as the read start position is closer to the EOT that is the tape end), the seek time is longer. For this reason, the scheduling unit 125 determines the reading order in the tape cartridges C1 to C4 in descending order of the value of the read start LPOS.

In the example illustrated in FIG. 12, the first is determined as the tape cartridge C3 and the fourth is determined as the tape cartridge C1. Since the tape cartridges C2 and C4 have the same read start LPOS, it is sufficient that one is determined as the second and the other as the third, whichever comes first. Here, as an example, the reading order is an order of the tape cartridges C3, C2, C4, and C1.

In this case, the read control unit 126 instructs the controller 23 of the tape library apparatus 20 to read first data from the position of LPOS=s of the wrap w2 in the tape cartridge C3 (read instruction RE1).

Next, the read control unit 126 instructs the controller 23 of the tape library apparatus 20 to read data from the position of the wrap w1 where LPOS=s/2 in the tape cartridge C2 (read instruction RE2).

Next, the read control unit 126 instructs the controller 23 of the tape library apparatus 20 to read data from the position of the wrap w2 where LPOS=s/2 in the tape cartridge C4 (read instruction RE3).

Next, the read control unit 126 instructs the controller 23 of the tape library apparatus 20 to read data from the position of the wrap w1 where LPOS=0 in the tape cartridge C1 (read instruction RE4).

Figure 13:
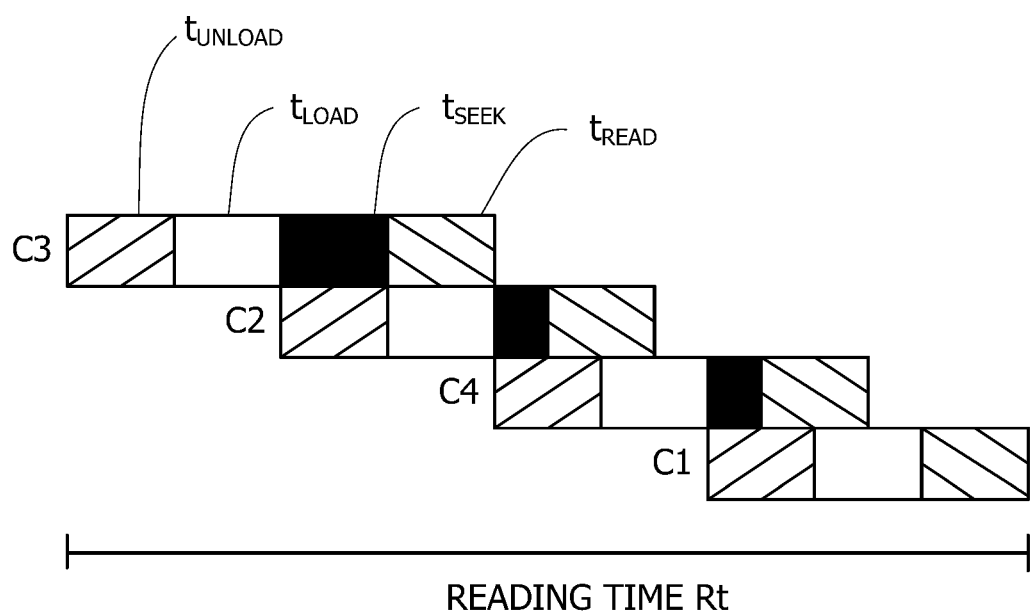
FIG. 13 is a diagram for explaining an example of a data reading time.

FIG. 13 is a diagram for explaining an example of a data reading time. FIG. 13 illustrates a reading time in the case illustrated in FIG. 12, and illustrates the breakdown of the reading time when data is read from the read start LPOS of each of the tape cartridges C3, C2, C4, and C1, in this order.

In the reading time Rt when data is read in the order of the tape cartridges C3, C2, C4, and C1 from each read start LPOS, a seek time $t(C1)_{SEEK}$ in the tape cartridge C1 that is read last is 0, and is represented by the following formula (4).

$$Rt = 4 \times (t_{UNLOAD} + t_{LOAD}) + t_{READ} \qquad (4)$$

By calculating the write start position by using the formulae (3a) and (3b) described above, even when reading from any reproduction time in the data stream is requested, it is guaranteed that the reading head LPOS of the tape cartridge to be read last is necessarily equal to or less than s/4. For example, a minimum value $Rt_{MIN}$, an average value $Rt_{AVG}$, and a maximum value $Rt_{MAX}$ of the reading time are represented by the following formulae (5a), (5b), and (5c), respectively.

$$R1_{MIN} = 4 \times (t_{UNLOAD} + t_{LOAD}) + t_{READ} \quad (5a)$$

$$R1_{AVG} = 4 \times (t_{UNLOAD} + t_{LOAD}) + (t_{SEEK(MAX)}/4) \times \frac{1}{2} + t_{READ} \quad (5b)$$

$$R1_{MAX} = 4 \times (t_{UNLOAD} + t_{LOAD}) + t_{SEEK(MAX)}/4 + t_{READ} \quad (5c)$$

As described above, a seek distance from the BOT in any of the tape cartridges is equal to or less than s/4 with respect to arbitrary read start position in the stream data. When N tape cartridges are used, the seek distance from the BOT is equal to or less than s/N in any of the tape cartridges. For this reason, by reading data from the tape cartridge in descending order of the seek distance, it is possible to shorten the average reading time and a maximum reading time.

Figure 14:
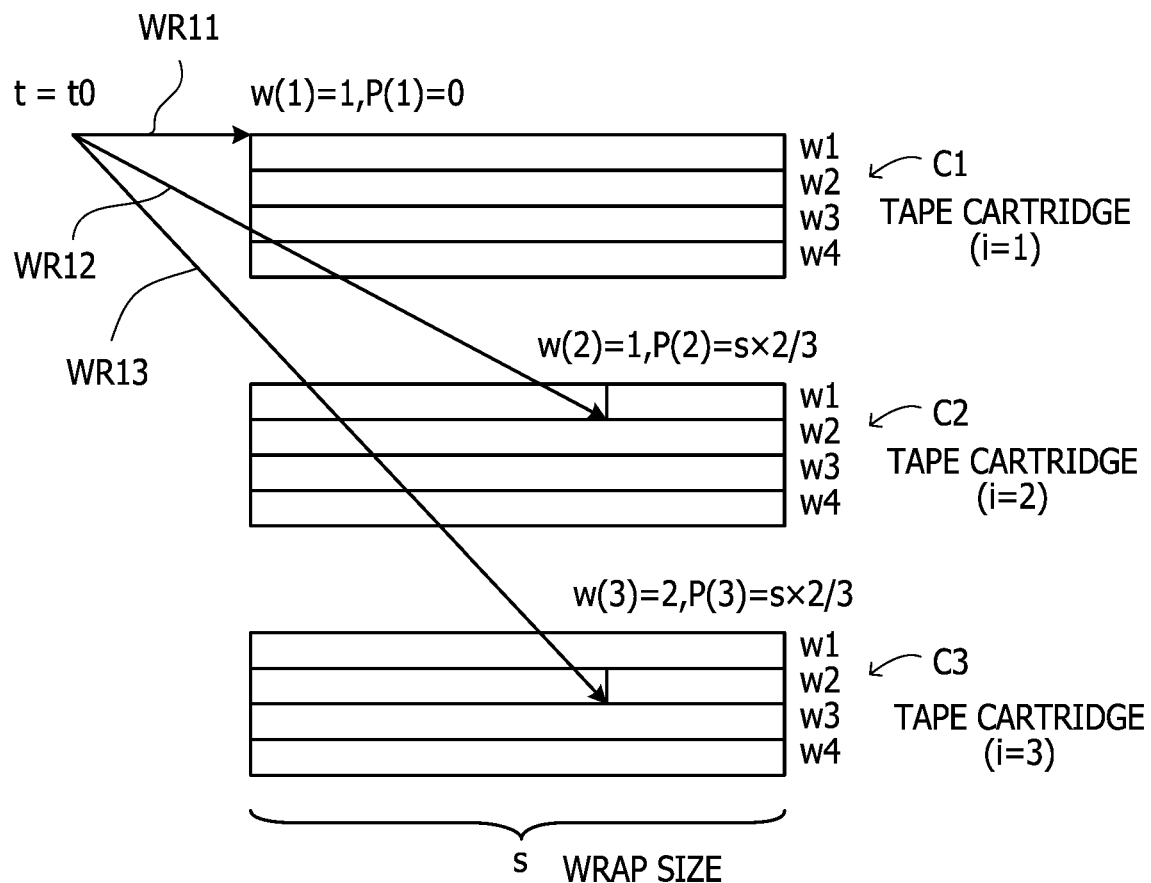
FIG. 14 is a diagram illustrating a second example of data write processing.

FIG. 14 is a diagram illustrating a second example of the data write processing. FIG. 14 illustrates an example of a case in which the number N of tape cartridges is 3. It is assumed that a data writing order is an order of the tape cartridges C1, C2, and C3. In this case, the write position calculation unit 122 calculates a write start wrap and a write start LPOS for each of the tape cartridges C1 to C3 as follows.

The formula (3a) is applied for the tape cartridge C1 having the tape cartridge number i of 1, and w(1)=1 and P(1)=0 are calculated. For this reason, the write control unit 123 instructs the controller 23 of the tape library apparatus 20 to write data from the position of the wrap w1 where LPOS=0 in the tape cartridge C1 (write instruction WR11). According to the instruction, for example, the tape drive 24a starts writing data in a forward direction from the position of the wrap w1 where LPOS=0 in the tape cartridge C1.

The formula (3a) is applied for the tape cartridge C1 having the tape cartridge number i of 2, and w(2)=1 and P(2)=s×⅔ are calculated. For this reason, the write control unit 123 instructs the controller 23 of the tape library apparatus 20 to write data from the position of the wrap w1 where LPOS=s×⅔ in the tape cartridge C2 (write instruction WR12). According to the instruction, for example, the tape drive 24b starts writing data in a forward direction from the position of the wrap w1 where LPOS=s×⅔ in the tape cartridge C2.

The formula (3b) is applied for the tape cartridge C3 having the tape cartridge number i of 3, and w(3)=2 and P(3)=s×⅔ are calculated. For this reason, the write control unit 123 instructs the controller 23 of the tape library apparatus 20 to write data from the position of the wrap w2 where LPOS=s×⅔ in the tape cartridge C3 (write instruction WR13). According to the instruction, for example, the tape drive 24c starts writing data in a backward direction from the position of the wrap w2 where LPOS=s×⅔ in the tape cartridge C3.

Figure 15:
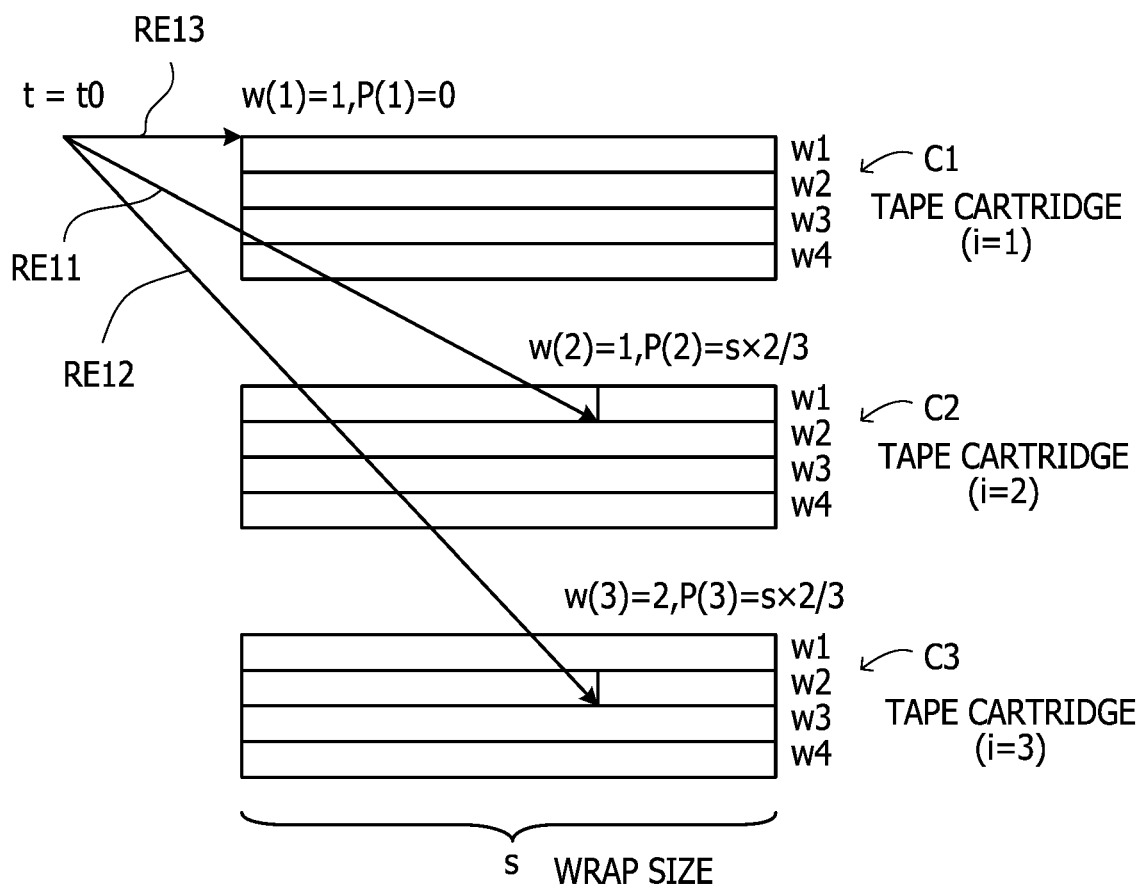
FIG. 15 is a diagram illustrating a second example of data read processing.

FIG. 15 is a diagram illustrating a second example of the data read processing. FIG. 15 illustrates an example of the read processing in a case where the data is written to the tape cartridges C1 to C3 as illustrated in FIG. 14. Here, as an example, it is assumed that reading from the reproduction time t=t0 indicating the head of the stream data is requested.

The read position calculation unit 124 calculates the read start wrap as wrap w1 and the read start LPOS as 0 based on the corresponding data management table 111a for the tape cartridge C1 having the tape cartridge number i of 1.

The read position calculation unit 124 calculates the read start wrap as wrap w1 and the read start LPOS as s×⅔ based on the corresponding data management table 111a for the tape cartridge C2 having the tape cartridge number i of 2.

The read position calculation unit 124 calculates the read start wrap as the wrap w2 and the read start LPOS as s×⅔ based on the corresponding data management table 111a for the tape cartridge C3 having the tape cartridge number i of 3.

Next, the scheduling unit 125 determines the reading order in the tape cartridges C1 to C3 in descending order of the value of the read start LPOS. In the example illustrated in FIG. 15, the third is determined as the tape cartridge C1. Since the tape cartridges C2 and C3 have the same read start LPOS, it is sufficient that one is determined as the first and the other as the second, whichever comes first. Here, as an example, the reading order is an order of the tape cartridges C2, C3, and C1.

In this case, the read control unit 126 first instructs the controller 23 of the tape library apparatus 20 to read data from the position of the wrap w1 where LPOS=s×⅔ in the tape cartridge C2 (read instruction RE11).

Next, the read control unit 126 instructs the controller 23 of the tape library apparatus 20 to read data from the position of the wrap w2 where LPOS=s×⅔ in the tape cartridge C3 (read instruction RE12).

Next, the read control unit 126 instructs the controller 23 of the tape library apparatus 20 to read data from the position of the wrap w1 where LPOS=0 in the tape cartridge C1 (read instruction RE13).

Accordingly, since the seek time for the tape cartridge C1 to be read last is 0, the entire reading time is shortened.

Next, processing of the server apparatus 10 is described by using a flowchart.

Figure 16:
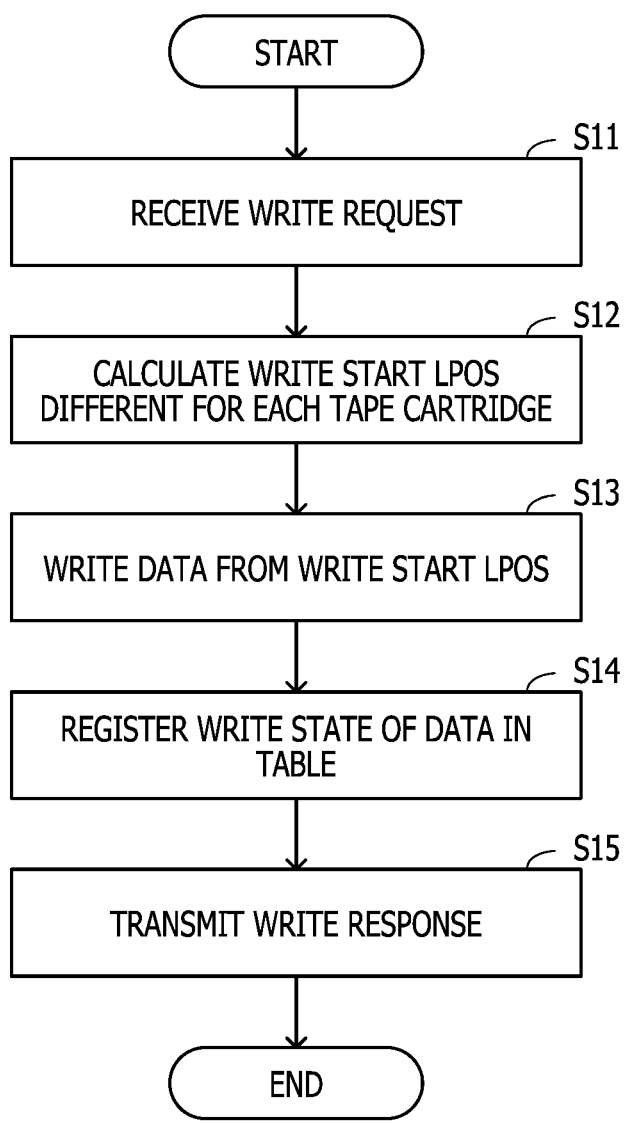
FIG. 16 is a flowchart illustrating an example of data write processing.

FIG. 16 is a flowchart illustrating an example of data write processing.

[Step S11] The I/O request reception unit 121 receives a write request from the client apparatus 30.

[Step S12] The write position calculation unit 122 calculates a write destination wrap and a write start LPOS different for each tape cartridge in accordance with formulae (3a) and (3b) based on the number of tape cartridges which are the write destinations, the writing order of the tape cartridges, and the wrap size.

[Step S13] The write control unit 123 instructs the controller 23 of the tape library apparatus 20 to write the striped data from the write destination wrap and the write start LPOS of each tape cartridge. Accordingly, the write processing in each tape drive is started.

[Step S14] The write control unit 123 registers information indicating a data write state of each tape cartridge in the data management table 111a. For example, every time data of a predetermined size is written, the write control unit 123 requests the controller 23 of the tape library apparatus 20 to notify the write position. In this case, the write control unit 123 creates a record in which the data reproduction time at which the writing is executed and the write position (wrap number and LPOS) notified from the controller 23 are associated with each other, and additionally registers the record in the corresponding data management table 111a. As another method, a record may be added to the data management table 111a by the write control unit 123 autonomously recognizing the reproduction time, the wrap number, and the LPOS.

[Step S15] When the write control unit 123 receives a write completion notification of all the data from the tape library apparatus 20, the I/O request reception unit 121 sends a write response indicating the write completion to the client apparatus 30.

FIG. 17 is a flowchart illustrating an example of the data read processing.

[Step S21] The I/O request reception unit 121 receives a read request from the client apparatus 30. At this time, designation of a reproduction time slot (reproduction start time and reproduction end time) to be read in the stream data is received.

[Step S22] The read position calculation unit 124 calculates the data read start position for each tape cartridge based on the designated reproduction time slot (here, for example, the reproduction start time) while referring to the data management information 111. As the read start position, a read start wrap number and a read start LPOS are calculated for each tape cartridge.

When the designated reproduction start time is registered in the corresponding data management table 111*a* in the data management information 111, the wrap number and the LPOS associated with the reproduction start time are acquired as the read start position. In a case where the designated reproduction start time is not registered in the corresponding data management table 111*a* in the data management information 111, the read start position is calculated by interpolation operation from the wrap number and the LPOS respectively associated with the reproduction times before and after the reproduction start time.

[Step S23] The scheduling unit 125 executes scheduling for determining the reading order from each tape cartridge. In the scheduling, the reading order of the tape cartridges is determined in descending order of the value of the read start LPOS.

[Step S24] The read control unit 126 instructs the controller 23 of the tape library apparatus 20 to read data from the tape cartridge in descending order of the value of the read start LPOS based on the scheduling result. Accordingly, the read processing in each tape drive is started.

[Step S25] When the data of the designated reproduction time slot is read from all the tape cartridges, the read control unit 126 combines the read data, restores the stream data included in the reproduction time slot, and outputs the stream data to the I/O request reception unit 121. The I/O request reception unit 121 transmits the restored stream data to the client apparatus 30 together with a read response.

As described above, according to the present embodiment, when stream data is striped and written to a plurality of tape cartridges, the LPOS section in which data of the same reproduction time slot is stored is changed by changing the write start LPOS for each tape cartridge. At the time of reading, data is sequentially read in order from the tape cartridge having the largest head LPOS of the data to be read. By performing such write/read processing, the average reading time may be shortened.

The above-described processing functions of the storage control apparatus 1 and the server apparatus 10 according to the present embodiment may be achieved by a computer. In this case, a program that describes details of processing to be performed by functions of the storage control apparatus 1 and the server apparatus 10 is provided. By executing the program on the computer, the processing function described above is implemented over the computer.

The program describing the details of the processing may be recorded in a computer-readable recording medium. Examples of the computer-readable recording medium include a magnetic storage unit, an optical disc, a semiconductor memory, and the like. Examples of the magnetic storage unit include a hard disk drive (HDD), a magnetic tape, and the like. Examples of the optical disc include CD, DVD, and the like.

When a program is to be distributed, for example, a portable-type recording medium such as an optical disc on which the program is recorded is sold. The program may be stored in a storage unit of a server computer and transferred from the server computer to another computer via a network.

For example, the computer executing the program stores, in its storage unit, a program recorded on the portable-type recording medium or a program transferred from the server computer. The computer reads the program from its storage unit and executes processing in accordance with the program. The computer may also read the program directly from the portable-type recording medium and execute processing in accordance with the program.

Each time a program is transferred from a server computer coupled via a network to a computer, the computer may sequentially execute processing in accordance with the received program. At least a part of the processing functions described above may be achieved by an electronic circuit such as a DSP, an ASIC, and a PLD.

Hereinbefore, the embodiments are exemplified, the configuration of each unit described in the embodiment may be replaced with another unit having the same function. Arbitrary other component or step may be added. Arbitrary two or more configurations (features) of the embodiments described above may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus for controlling a tape apparatus including a plurality of tape drives, the storage control apparatus comprising:
    a memory, and
    a processor coupled to the memory and configured to:
    calculate, when causing the tape apparatus to execute write processing of dividing write data into a predetermined size and writing to a plurality of magnetic tapes by using the plurality of tape drives by striping, based on a number of magnetic tapes included in the plurality of magnetic tapes, a track size for one track in the plurality of magnetic tapes, and an order of mounting the plurality of magnetic tapes on any of the plurality of tape drives, a write start position of the write data for each of the plurality of magnetic tapes where the write start position being different in each of the plurality of magnetic tapes and instruct the tape apparatus to execute write processing; and
    specify, when a reading range is designated from the write data, a read start position indicating a head position of data in the reading range for each of the plurality of magnetic tapes, and instruct the tape apparatus to read data in the reading range in an order from a magnetic tape of which the read start position is closer to an end of the magnetic tape among the plurality of magnetic tapes.

2. The storage control apparatus according to claim 1, wherein each of the plurality of magnetic tapes includes a plurality of tracks including a first track that is a head track and a second track that follows the first track and is read and written in a backward direction, and in the calculation of the write start position, the write start position is calculated in a range of the plurality of tracks for each of the plurality of magnetic tapes.

3. The storage control apparatus according to claim 2, wherein in the calculation of the write start position, the write start positions in the range of the plurality of tracks are uniformly distributed among the plurality of magnetic tapes, and of the plurality of magnetic tapes, the write start position for each of the plurality of magnetic tapes is calculated so that the earlier an order of the magnetic tape mounted on any of the plurality of tape drives, the closer the write start position is to a head of the range of the plurality of tracks.

4. The storage control apparatus according to claim 1, further comprising a storage area,
wherein the processor is further configured to
generate, when the tape apparatus is caused to execute the write processing, management information indicating a positional relationship between a write position over the track and the write data that has been written for each of the plurality of magnetic tapes,
store the management information in the storage area, and
specify the read start position in each of the plurality of magnetic tapes based on the management information.

5. A storage control method performed by a storage control apparatus for controlling a tape apparatus including a plurality of tape drives, the storage control method comprising steps of:
calculating, when causing the tape apparatus to execute write processing of dividing write data into a predetermined size and writing to a plurality of magnetic tapes by using the plurality of tape drives by striping, based on a number of magnetic tapes included in the plurality of magnetic tapes, a track size for one track in the plurality of magnetic tapes, and an order of mounting the plurality of magnetic tapes on any of the plurality of tape drives, a write start position of the write data for each of the plurality of magnetic tapes where the write start position being different in each of the plurality of magnetic tapes and instructing the tape apparatus to execute write processing; and
specifying, when a reading range is designated from the write data, a read start position indicating a head position of data in the reading range for each of the plurality of magnetic tapes, and instructing the tape apparatus to read data in the reading range in an order from a magnetic tape of which the read start position is closer to an end of the magnetic tape among the plurality of magnetic tapes.

\* \* \* \* \*